(12) United States Patent
Bernat et al.

(10) Patent No.: US 10,255,305 B2
(45) Date of Patent: Apr. 9, 2019

(54) TECHNOLOGIES FOR OBJECT-BASED DATA CONSISTENCY IN DISTRIBUTED ARCHITECTURES

(71) Applicant: Intel Corporation, Santa Clara, CA (US)

(72) Inventors: Francesc Guim Bernat, Barcelona (ES); Thomas Willhalm, Sandhausen (DE); Karthik Kumar, Chandler, AZ (US); Raj K. Ramanujan, Federal Way, WA (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 15/260,618

(22) Filed: Sep. 9, 2016

(65) Prior Publication Data

US 2018/0075069 A1    Mar. 15, 2018

(51) Int. Cl.
| | |
|---|---|
| *G06F 17/00* | (2006.01) |
| *G06F 17/30* | (2006.01) |
| *H04L 29/08* | (2006.01) |
| *G06F 12/0804* | (2016.01) |
| *G06F 12/0815* | (2016.01) |

(52) U.S. Cl.
CPC .... *G06F 17/30303* (2013.01); *G06F 12/0804* (2013.01); *G06F 12/0815* (2013.01); *H04L 67/2842* (2013.01); *H04L 67/2852* (2013.01); *G06F 2212/1008* (2013.01); *G06F 2212/608* (2013.01)

(58) Field of Classification Search
CPC .......... G06F 17/30303; G06F 12/0804; G06F 12/0815; G06F 2212/1008; G06F 2212/608; H04L 67/2852; H04L 67/2842

USPC ........................................................ 707/690
See application file for complete search history.

(56) References Cited

U.S. PATENT DOCUMENTS

| | | | |
|---|---|---|---|
| 2005/0108298 A1* | 5/2005 | Iyengar ............ | G06F 17/30215 |
| 2005/0108481 A1* | 5/2005 | Iyengar ............... | G06F 12/0817 |
| | | | 711/141 |
| 2010/0023693 A1* | 1/2010 | Dilley .................... | H04L 29/06 |
| | | | 711/118 |

OTHER PUBLICATIONS

Lan, Jiang, et al., "Consistency Maintenance in Peer-to-Peer File Sharing Networks", WIAPP 2003, San Jose, CA, Jun. 24, 2003, pp. 90-94.*

(Continued)

*Primary Examiner* — Robert Stevens
(74) *Attorney, Agent, or Firm* — Barnes & Thornburg LLP

(57) ABSTRACT

Technologies for object-based data consistency in a fabric architecture includes a network switch communicatively coupled to a plurality of computing nodes. The network switch is configured to receive an object read request that includes an object identifier and a data consistency threshold from one of the computing nodes. The network switch is additionally configured to perform a lookup for a value of an object in the cache memory as a function of the object identifier and determine whether a condition of the value of the object violates the data consistency threshold in response to a determination that the lookup successfully returned the value of the object. The network switch is further configured to transmit the value of the object to the computing node in response to a determination that the condition of the value of the object does not violate the data consistency threshold. Other embodiments are described herein.

25 Claims, 6 Drawing Sheets

(56) References Cited

OTHER PUBLICATIONS

Yin, Liangzhong, et al., "Supporting Cooperative Caching in Ad Hoc Networks", IEEE Transactions on Mobile Computing, vol. 5, No. 1, Jan. 2006, pp. 77-89.*

* cited by examiner

TECHNOLOGIES FOR OBJECT-BASED DATA CONSISTENCY IN DISTRIBUTED ARCHITECTURES

BACKGROUND

Demands by individuals, researchers, and enterprises for increased compute performance and storage capacity of computing devices have resulted in various computing technologies developed to address those demands For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multi-processor/multi-core network nodes connected via high-speed interconnects (e.g., fabric interconnects in a unified fabric).

To carry out such processor intensive computations, various computing technologies have been implemented to distribute workloads across different network computing devices, such as parallel computing, distributed computing, etc. In support of such distributed workload operations, multiprocessor hardware architecture (e.g., multiple multi-core processors that share memory) has been developed to facilitate multiprocessing (i.e., coordinated, simultaneous processing by more than one processor) across local and remote shared memory systems using various parallel computer memory design architectures, such as non-uniform memory access (NUMA), and other distributed memory architectures.

As a result of the distributed computing architectures, information for a given application can be stored across multiple interconnected computing nodes. As such, shared resource data may be stored in local caches of two or more of the interconnected computing nodes. Accordingly, some scale-out client-server software architectures rely on data consistency models rather than memory coherency models, such that certain software may not need access to the latest value of a given object. However, such architectures tend to have high query rates, which can negatively impact bandwidth and hardware (e.g., memory, processors, etc.) availability and utilization.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
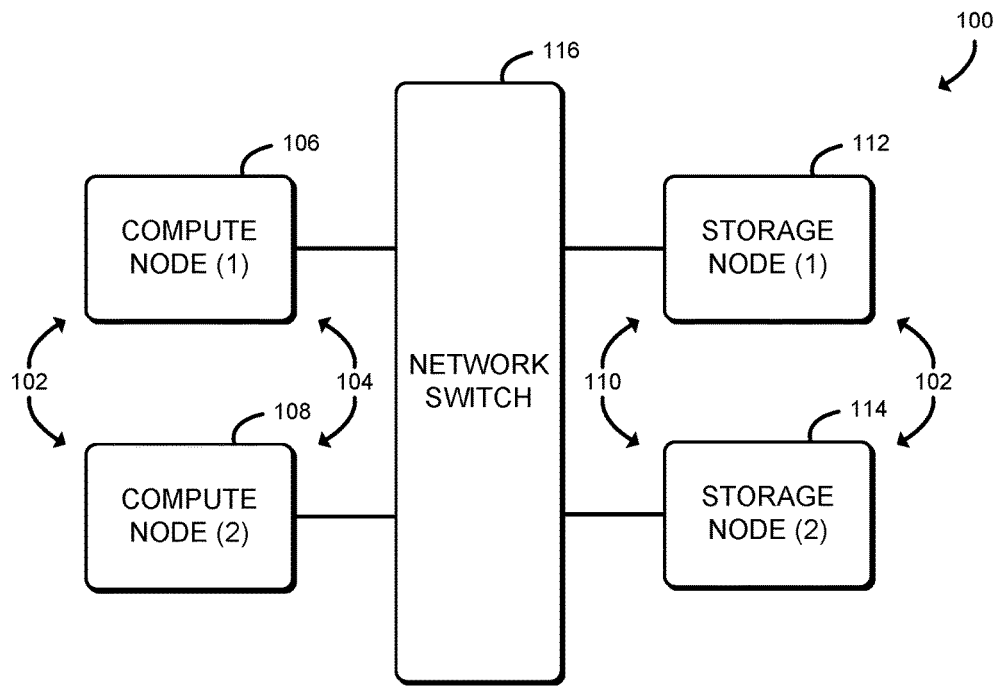
FIG. 1 is a simplified block diagram of at least one embodiment of a system for object-based data consistency in distributed architectures that includes multiple computing nodes communicatively coupled via a network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for object-based data consistency in distributed architectures includes multiple computing nodes 102 communicatively coupled via a series of fabric interconnects to a network switch 116. It should be appreciated that, in other embodiments, there may be any number of computing nodes 102 (e.g., client computing nodes, storage computing nodes, etc.) coupled to the illustrative network switch 116 or another network switch 116 in the system 100. Accordingly, there may be multiple network switches 116 in other embodiments. It should be further appreciated that, in such embodiments, multiple network switches 116 may be connected, or daisy chained, to each other.

Each computing node 102, or cluster of computing nodes 102, may be configured to function as a different coherent domain that can communicate with other computing nodes 102, or clusters of computing nodes 102, across the interconnect fabric. As such, using the interconnect fabric, each coherent domain can expose a number of address regions to the other coherent domains. However, it should be appreciated that accesses between different coherent domains are not coherent. Accordingly, it should be further appreciated that the interconnect fabric allows the mapping of addresses of memory ranges between different coherent domains.

In use, a computing node 102 (e.g., one of the compute nodes 104) transmits an object read request (e.g., via a get command) to the network switch 116 requesting a value of an object stored at another computing node 102 (e.g., one of the storage nodes 110) communicatively coupled to the network switch 116. It should be appreciated that the term "object" or "objects" as used herein may refer to any type of structure which may contain data (e.g., attributes in fields), code (e.g., methods, procedures, etc.), etc. The object read request includes one or more identifiers usable to identify the object, such as a base address of the object, and one or more data consistency thresholds. The data consistency thresholds define a threshold usable to determine whether an object value presently stored in a cache memory of the network switch 116 is usable or is an otherwise acceptable value for the computational purposes of the application presently executing on the computing node 102 that generated the object read request. Such data consistency thresholds may include a minimum acceptable version number, a maximum duration of time to store in cache, a maximum number of accesses, etc. Upon receiving the object read request, the network switch 116 determines whether to return the object value associated with the object read request that is presently stored in cache (i.e., in a cache line of the cache) or forward the object read request to the applicable one of the storage nodes 110 at which the requested object value is stored.

To do so, the network switch 116 verifies whether the requested object value presently stored in the cache violates (e.g., exceeds a maximum threshold value, falls below a minimum threshold value, falls out of a particular value range, etc.) one or more data consistency thresholds. If so, the network switch 116 forwards the object read request to the corresponding one of the storage nodes 110, updates the value of the object in cache and other object information in response to having received a response from the corresponding one of the storage nodes 110 that includes the updated object value, and returns the updated object value to the requesting one of the compute nodes 104. Otherwise, if the presently stored data does not violate the one or more data consistency thresholds, the network switch 116 returns the object value presently stored in the cache to the requesting one of the compute nodes 104.

The computing nodes 102 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system. In other words, the computing nodes 102 may be embodied as compute nodes (e.g., client nodes) and/or storage nodes (e.g., database nodes). For example, illustrative computing nodes 102 include compute nodes 104 and storage nodes 110. The illustrative compute nodes 104 includes a first compute node, which is designated as compute node (1) 106, and a second compute node, which is designated as compute node (2) 108. Similarly, the illustrative storage nodes 110 includes a first storage node, which is designated as storage node (1) 112, and a second storage node, which is designated as storage node (2) 114.

It should be appreciated that those computing nodes 102 implemented as storage nodes 110 may generally include more data storage capacity than those computing nodes 102 that are embodied as compute nodes 104. Similarly, it should also be appreciated that those computing nodes 102 implemented as compute nodes 104 may generally include more processor capability that those computing nodes 102 implemented as storage nodes 110. In other words, the storage nodes 110 may be embodied as physical servers including numerous hard-disk drives (HDDs) or solid-state drives (SDDs) relative to the number of storage devices of the compute nodes 104, whereas the compute nodes may be embodied as physical servers including numerous processors having multiple cores relative to the number of processors of the storage nodes. However, it should be further appreciated that any of the computing nodes 102 may be implemented as a compute node and/or a storage node, regardless of the component configuration relative to the other computing nodes 102. Further, it should be appreciated that the computing nodes 102 may include additional and/or alternative computing nodes, such as controller nodes, network nodes, utility nodes, etc., which are not shown to preserve clarity of the description.

Figure 2:
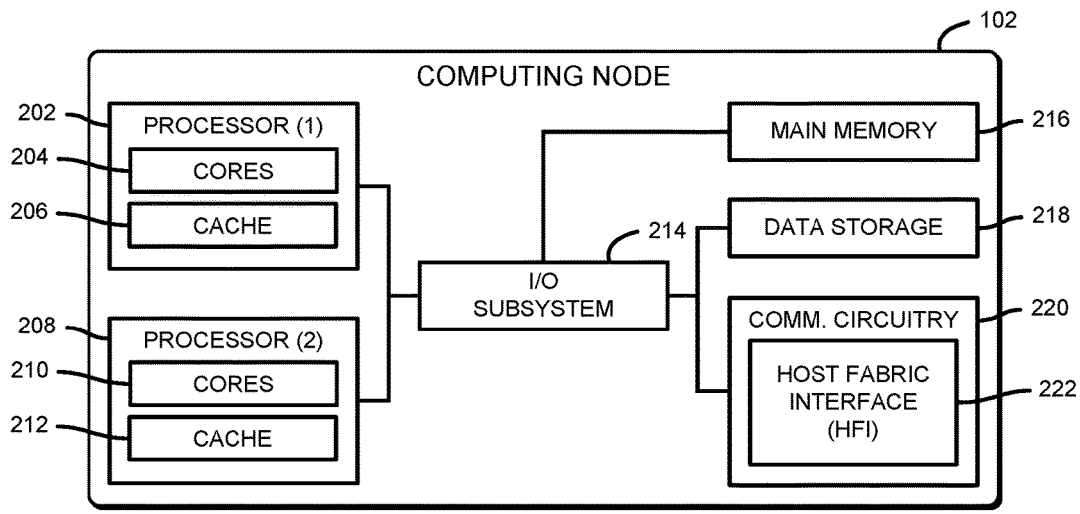
FIG. 2 is a simplified block diagram of at least one embodiment of one of the computing nodes of the system of FIG. 1.

As shown in FIG. 2, an illustrative computing node 102 includes a first processor, designated as processor (1) 202, a second processor, designated as processor (2) 208, an input/output (I/O) subsystem 214, a main memory 216, a data storage device 218, and communication circuitry 220. Of course, it should be appreciated that one or more of the computing nodes 102 may include other or additional components, such as those commonly found in a computing device (e.g., peripheral devices, other processing/storage hardware, etc.), in other embodiments. Additionally, in some embodiments, one or more of the illustrative components may be incorporated in, or otherwise form a portion of, another component. For example, cache memory of the computing node 102 (e.g., cache memory 206, 212), or portions thereof, may be incorporated in one or both of the processors 202, 208 in some embodiments. Further, in some embodiments, one or more of the illustrative components may be omitted from the computing node 102. For example, although the illustrative computing node 102 includes two processors 202, 208, the computing node 102 may include a greater number of processors in other embodiments.

Each of the processors 202, 208 (i.e., physical processor packages) may be embodied as any type of multi-core processor capable of performing the functions described herein, such as, but not limited to, a single physical multi-processor core chip, or package. The illustrative processor (1) 202 includes a number of processor cores 204, while the illustrative processor (2) 208 similarly includes a number of processor cores 210. As described previously, each of the processors 202, 208 includes more than one processor core (e.g., 2 processors cores, 4 processors cores, 8 processors cores, 16 processors cores, etc.).

Each of processor cores 204, 210 is embodied as an independent logical execution unit capable of executing programmed instructions. In some embodiments, the processor cores 204, 210 may include a portion of cache memory (e.g., an L1 cache) and functional units usable to independently execute programs or threads. It should be appreciated that, in some embodiments of the computing node 102 (e.g., supercomputers), the computing node 102 may include thousands of processor cores. Each of the processors 202, 208 may be connected to a physical connector, or socket, on a motherboard (not shown) of the computing node 102 that is configured to accept a single physical processor package (i.e., a multi-core physical integrated circuit).

The illustrative processor (1) 202 additionally includes a cache memory 206 and the illustrative processor (2) 208 includes a cache memory 212. Each cache memory 206, 212 may be embodied as any type of cache that the respective processor 202, 208 can access more quickly than the main memory 216, such as an on-die or on-processor cache. In other embodiments, the cache memory 206, 212 may be an off-die cache, but reside on the same system-on-a-chip (SoC) as the respective processor 202, 208. It should be appreciated that, in some embodiments, the cache memory 206, 212 may have a multi-level architecture. In other words, in such multi-level architecture embodiments, the cache memory 206, 212 may be embodied as one or more of an L1, L2, or L3 cache, for example.

The main memory 216 may be embodied as any type of volatile or non-volatile memory or data storage device capable of performing the functions described herein. In operation, the main memory 216 may store various data and software used during operation of the computing node 102, such as operating systems, applications, programs, libraries, and drivers. The main memory 216 is communicatively coupled to the processors 202, 208 via the I/O subsystem 214, which may be embodied as circuitry and/or components to facilitate input/output operations with the processors 202, 208, the main memory 216, and other components of the computing node 102. For example, the I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 214 may form a portion of a SoC and be incorporated, along with one or both of the processors 202, 208, the main memory 216, and/or other components of the computing node 102, on a single integrated circuit chip.

The data storage device 218 may be embodied as any type of device or devices configured for short-term or long-term storage of data such as, for example, memory devices and circuits, memory cards, hard disk drives, solid-state drives, or other data storage devices. It should be appreciated that the data storage device 218 and/or the main memory 216 (e.g., the computer-readable storage media) may store various data as described herein, including operating systems, applications, programs, libraries, drivers, instructions, etc., capable of being executed by a processor (e.g., the processor 202, the processor 208, etc.) of the computing node 102.

The communication circuitry 220 may be embodied as any communication circuit, device, or collection thereof, capable of enabling wireless and/or wired communications between the computing node 102 and other computing devices (e.g., another one of the computing nodes 102, the network switch 116, etc.). The communication circuitry 220 may be configured to use one or more communication technologies (e.g., wireless or wired communication technologies) and associated protocols (e.g., Internet Protocol (IP), Ethernet, Bluetooth®, Wi-Fi®, WiMAX, LTE, 5G, etc.) to effect such communication.

The illustrative communication circuitry 220 includes a host fabric interface (HFI) 222. The HFI 222 may be embodied as one or more add-in-boards, daughtercards, network interface cards, controller chips, chipsets, or other devices that may be used by the computing node 102. For example, in some embodiments, the HFI 222 may be integrated with one or both of the processors 202, 208 (e.g., on a coherent fabric within one or both of the processors 202, 208), embodied as an expansion card coupled to the I/O subsystem 214 over an expansion bus (e.g., PCI Express (PCIe)), part of a SoC that includes one or more processors, or included on a multichip package that also contains one or more processors. Additionally or alternatively, in some embodiments, functionality of the HFI 222 may be integrated into one or more components of the computing node 102 at the board level, socket level, chip level, and/or other levels. The HFI 222 is configured to facilitate the transfer of data/messages to enable tasks executing on the processors 202, 208 to access shared structures (e.g., shared physical memory) of the other computing nodes 102, such as may be necessary during parallel or distributed computing operations as described herein.

Referring again to FIG. 1, the network switch 116 may be embodied as any type of switching device (e.g., a crossbar switch) capable of forwarding network traffic through the fabric (e.g., via fabric interconnects) in a switched, or switching, fabric architecture, such as a switch (e.g., rack-mounted, standalone, fully managed, partially managed, full-duplex, and/or half-duplex communication mode enabled, etc.), a router, etc. As described previously, the network switch 116 relies on fabric interconnects to communicatively couple the network switch 116 to a number of respective computing nodes 102. The fabric interconnects may be embodied as one or more buses, switches, and/or networks configured to support transmission of network traffic as a function of various interconnect protocols and/or network protocols. In use, the fabric interconnects are utilized by the computing nodes 102 (e.g., via respective HFIs 222) to communicate with the network switch 116 and the other computing nodes 102 (i.e., across the interconnect fabric).

Figure 3:
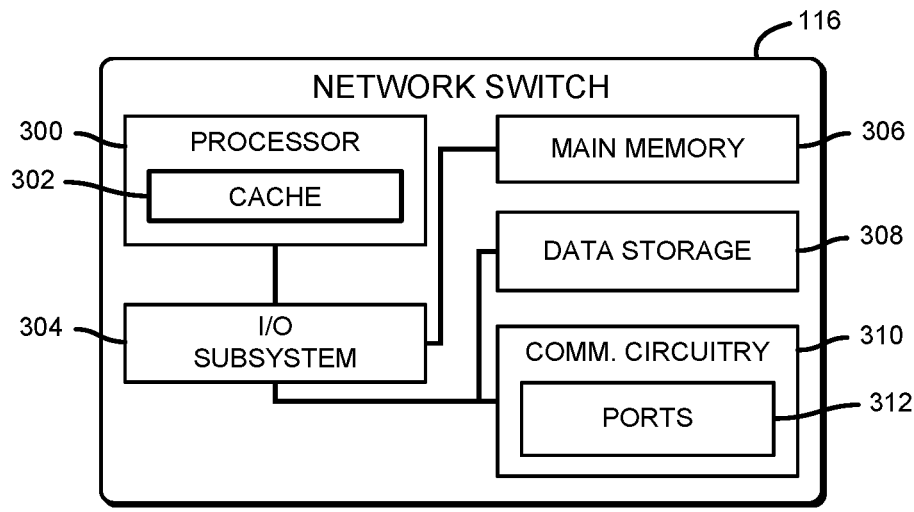
FIG. 3 is a simplified block diagram of at least one embodiment of the network switch of the system of FIG. 1.

As shown in FIG. 3, similar to the illustrative computing node 102 of FIG. 2, an illustrative network switch 116 includes a processor 300 include cache memory 302, an I/O subsystem 304, a main memory 306, a data storage device 308, and communication circuitry 310. As such, further descriptions of the like components are not repeated herein with the understanding that the description of the corresponding components provided above in regard to the illustrative computing node 102 of FIG. 2 applies equally to the corresponding components of the network switch 116 of FIG. 3. Of course, it should be appreciated that the network switch 116 may include other or additional components, such as those commonly found in a network traffic switching device (e.g., peripheral devices, other processing/storage hardware, etc.), in other embodiments. Additionally, in some embodiments, one or more of the illustrative components may be incorporated in, or otherwise form a portion of, another component. Further, in some embodiments, one or more of the illustrative components may be omitted from the network switch 116.

The illustrative communication circuitry 310 includes multiple switch ports 312 (i.e., input/output ports) for transmitting and receiving data to/from the network switch 116. Accordingly, in some embodiments, the network switch 116 may be configured to create a separate collision domain for each of the switch ports 312. As such, depending on the network design of the network switch 116 and the operation mode (e.g., half-duplex, full-duplex, etc.), it should be appreciated that each of the computing nodes 102 connected to one of the switch ports 312 of the network switch 116 may be configured to transfer data to any of the other computing nodes 102 at any given time, and the transmissions should not interfere, or collide.

Figure 4:
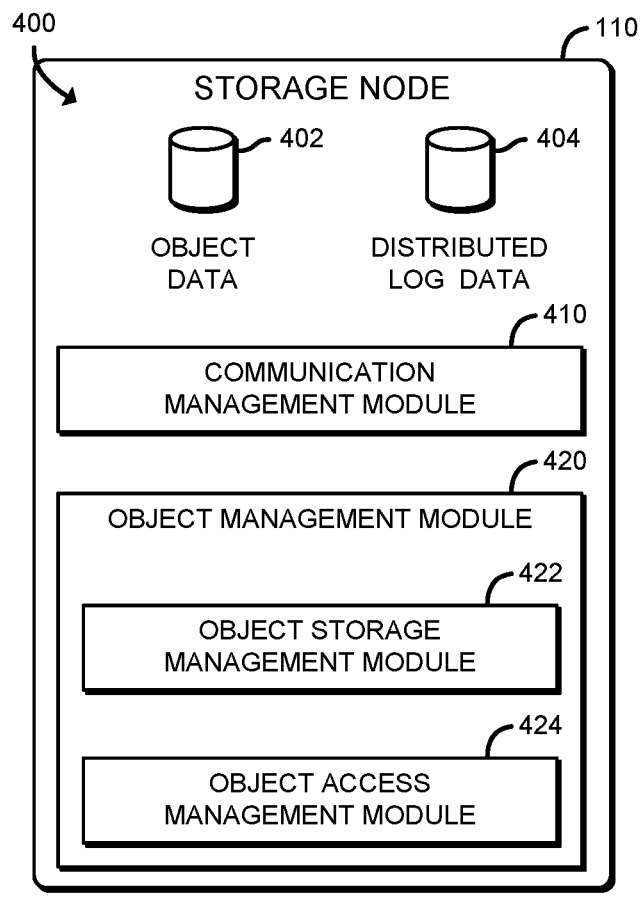
FIG. 4 is a simplified block diagram of at least one embodiment of an environment that may be established by one of the storage nodes of the system of FIG. 1.

Referring now to FIG. 4, in an illustrative embodiment, one of the computing nodes 102 (e.g., one of the storage nodes 110 of FIG. 1) configured to manage the storage of objects establishes an environment 400 during operation. The illustrative environment 400 includes a communication management module 410 and an object management module 420. The various modules of the environment 400 may be embodied as hardware, firmware, software, or a combination thereof. As such, in some embodiments, one or more of the modules of the environment 400 may be embodied as circuitry or collection of electrical devices (e.g., a communication management circuit 410, an object management circuit 420, etc.).

It should be appreciated that, in such embodiments, one or more of the communication management circuit 410 and the object management circuit 420 may form a portion of one or more of the processors 202, 208, the I/O subsystem 214, the communication circuitry 220 (e.g., the HFI 222), and/or other components of the storage node 110. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the one or more processors and/or other components of the storage node 110.

In the illustrative environment 400, the storage node 110 further includes object data 402 and distributed log data 404, each of which may be stored in the main memory 216, the data storage device 218, and/or another data storage medium (e.g., a local memory (not shown) of the HFI 222) of the storage node 110. Further, each of the object data 402 and the distributed log data 404 may be accessed by the various modules and/or sub-modules of the storage node 110. Additionally, it should be appreciated that in some embodiments the data stored in, or otherwise represented by, each of the object data 402 and the distributed log data 404 may not be mutually exclusive relative to each other.

For example, in some implementations, data stored in the object data 402 may also be stored as a portion of the distributed log data 404, and/or vice versa. As such, although the various data utilized by the storage node 110 is described herein as particular discrete data, such data may be combined, aggregated, and/or otherwise form portions of a single or multiple data sets, including duplicative copies, in other embodiments. It should be further appreciated that the storage node 110 may include additional and/or alternative components, sub-components, modules, sub-modules, and/or devices commonly found in a computing device, which are not illustrated in FIG. 4 for clarity of the description.

The communication management module 410, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the storage node 110. To do so, the communication management module 410 is configured to receive and process network packets from network computing devices (e.g., other computing nodes 102, network switches 116, etc.) communicatively coupled to the storage node 110 (e.g., via fabric interconnects). Additionally, the communication management module 410 is configured to prepare and transmit network packets to network computing devices (e.g., other computing nodes 102, network switches 116, etc.) communicatively coupled to the storage node 110 (e.g., via fabric interconnects).

The object management module 420, which may be embodied as hardware, firmware, software, virtualized hardware, emulated architecture, and/or a combination thereof as discussed above, is configured to manage the object values stored in memory (e.g., the main memory 216, the data storage device 218, etc.) of the storage node 110. To do so, the illustrative object management module 420 includes an object storage management module 422 and an object access management module 424. It should be appreciated that each of the object storage management module 422 and the object access management module 424 of the object management module 420 may be separately embodied as hardware, firmware, software, virtualized hardware, emulated architecture, and/or a combination thereof. For example, the object storage management module 422 may be embodied as a hardware component, while the object access management module 424 may be embodied as a virtualized hardware component or as some other combination of hardware, firmware, software, virtualized hardware, emulated architecture, and/or a combination thereof.

The object storage management module 422 is configured to manage object storage. To do so, the object storage management module 422 is configured to allocate portions of memory and store object values therein, as well as delete the object values and free the allocated portions of memory allocated thereto. In some embodiments, the object storage management module 422 may be configured to function as a memory manager in software (e.g., incorporated in an operating system) and/or hardware (e.g., a memory management unit) of the storage node 110. In some embodiments, the object values may be stored in the object data 402.

The object access management module 424 is configured to manage the access to the object values stored by the storage node 110, such as may be managed by the object storage management module 422. To do so, the object access management module 424 is configured to process read and write requests to memory of the storage node 110. In other words, the object access management module 424 is configured to write data to an allocated portion of memory (e.g., a portion of memory allocated to store a particular object) as a result of a valid write operation and manage the retrieval of requested data as a result of a valid read operation. Accordingly, the object access management module 424 is further configured to determine the validity of the read/write requests received by the storage node 110. Additionally, the object access management module 424 is configured to manage data coherency, such as may be required on a valid write to a particular block of memory allocated to a stored object. In some embodiments, the object access management module 424 may also be configured to function as a scheduler (e.g., a memory access scheduler) usable to interface between cache (e.g., the cache memory 206, 212 of FIG. 2) and main memory (e.g., the main memory 216 of FIG. 2) of the storage node 110.

The object storage management module 422 and/or the object access management module 424 may be additionally configured to manage a log of transactions, or some other abstraction of storage, such as may be stored in a file or a table, for tracking information about modifications to objects. Accordingly, in such embodiments, the transaction log may include information about the object value, such as a timestamp of an access request (e.g., read/write requests) or data change, a version of the data presently stored at the object, a present state of the data, etc. In some embodiments, the transaction log may be usable to replicate data between databases. Additionally, in some embodiments, the transaction log may be stored in the distributed log data 404.

Figure 5:
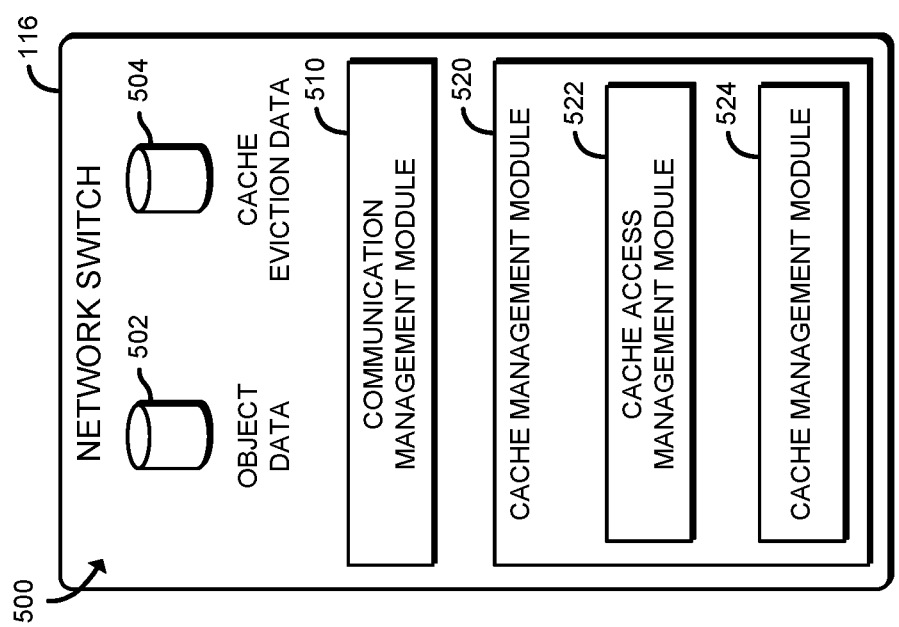
FIG. 5 is a simplified block diagram of at least one embodiment of an environment that may be established by the network switch of FIG. 3.

Referring now to FIG. 5, in an illustrative embodiment, the network switch 116 establishes an environment 500 during operation. The illustrative environment 500 includes a communication management module 510 and a cache management module 520. The various modules of the environment 500 may be embodied as hardware, firmware, software, or a combination thereof. As such, in some embodiments, one or more of the modules of the environment 500 may be embodied as circuitry or collection of electrical devices (e.g., a communication management circuit 510, a cache management circuit 520, etc.).

It should be appreciated that, in such embodiments, one or both of the communication management circuit 510 and the cache management circuit 520 may form a portion of the processor 300, the I/O subsystem 304, the communication circuitry 310, and/or other components of the network switch 116. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the one or more processors and/or other components of the network switch 116.

In the illustrative environment 500, the network switch 116 further includes object data 502 and cache eviction data 504, each of which may be stored in the cache memory 302, the main memory 306, the data storage device 308, and/or another data storage medium of the network switch 116. Further, each of the object data 502 and the cache eviction data 504 may be accessed by the various modules and/or sub-modules of the network switch 116. Additionally, it should be appreciated that in some embodiments the data stored in, or otherwise represented by, each of the object data 502 and the cache eviction data 504 may not be mutually exclusive relative to each other.

For example, in some implementations, data stored in the object data 502 may also be stored as a portion of the cache eviction data 504, and/or vice versa. As such, although the various data utilized by the network switch 116 is described herein as particular discrete data, such data may be combined, aggregated, and/or otherwise form portions of a single or multiple data sets, including duplicative copies, in other embodiments. It should be further appreciated that the network switch 116 may include additional and/or alternative components, sub-components, modules, sub-modules, and/or devices commonly found in a computing device, which are not illustrated in FIG. 5 for clarity of the description.

The communication management module 510, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the network switch 116. To do so, the communication management module 510 is configured to receive and process network packets from network computing devices (e.g., computing nodes 102, other network switches 116, etc.) communicatively coupled to the network switch 116 (e.g., via fabric interconnects). Additionally, the communication management module 510 is configured to prepare and transmit network packets to network computing devices (e.g., computing nodes 102, other network switches 116, etc.) communicatively coupled to the network switch 116 (e.g., via fabric interconnects).

The cache management module 520, which may be embodied as hardware, firmware, software, virtualized hardware, emulated architecture, and/or a combination thereof as discussed above, is configured to manage the data stored in cache of the network switch 116 (e.g., the cache memory 302 of FIG. 3). In other words, the cache management module 520 is configured to store data in cache, control access to the data stored therein, and enforce eviction policies thereon. To do so, the illustrative cache management module 520 includes a cache access management module 522 and a cache eviction management module 524. It should be appreciated that each of the cache access management module 522 and the cache eviction management module 524 of the cache management module 520 may be separately embodied as hardware, firmware, software, virtualized hardware, emulated architecture, and/or a combination thereof. For example, the cache access management module 522 may be embodied as a hardware component, while the cache eviction management module 524 may be embodied as a virtualized hardware component or as some other combination of hardware, firmware, software, virtualized hardware, emulated architecture, and/or a combination thereof.

The cache access management module 522 is configured to manage read and write accesses to the cache memory 302 of the network switch 116. Accordingly, the cache access management module 522 is configured to receive object read requests (e.g., from one of the compute nodes 104) requesting to return a value of an object (i.e., an object value), determine whether the object value resides in cache, and return an indication of whether the object value resides in cache (e.g., return the value of the object) in response to having received the request. The cache access management module 522 is additionally configured to receive write requests that include a value of the object and add, or edit, the object value into a corresponding cache line in the cache.

The objects are cached at object granularity such that each of the objects may be identified by a base address and size. As such, the cache access management module 522 is configured to write such object information (i.e., the base address and size of the corresponding object) to the respective cache line such that the cache access management module 522 can use the base address to perform a lookup on the cache for a corresponding object. The cache access management module 522 is further configured to write any object information in addition to the object identifiers (e.g., the base address and size of the object) to each cache line corresponding to an object, including the value of the object, one or more data consistency thresholds (e.g., a minimum acceptable version threshold, a maximum cache duration threshold, etc.), and one or more bits (e.g., least recently used (LRU) age-bit(s)) usable to enforce a cache eviction policy. In some embodiments, the object information may be stored in the object data 502.

The cache eviction management module 524 is configured to manage eviction of data from cache lines of the cache (e.g., the cache memory 302) of the network switch 116, such as when the cache is full. To do so, the cache eviction management module 524 is configured to enforce cache eviction policies (i.e., cache replacement algorithms/policies). It should be appreciated that there may be more than one cache eviction policy. For example, the cache eviction policies may include a least recently used (LRU) cache eviction policy, a most recently used (MRU) cache eviction policy, a 2-way set associative cache eviction policy, a direct mapped cache eviction policy, etc. In some embodiments, the cache eviction policies and/or information related thereto may be stored in the cache eviction data 504.

Figure 6:
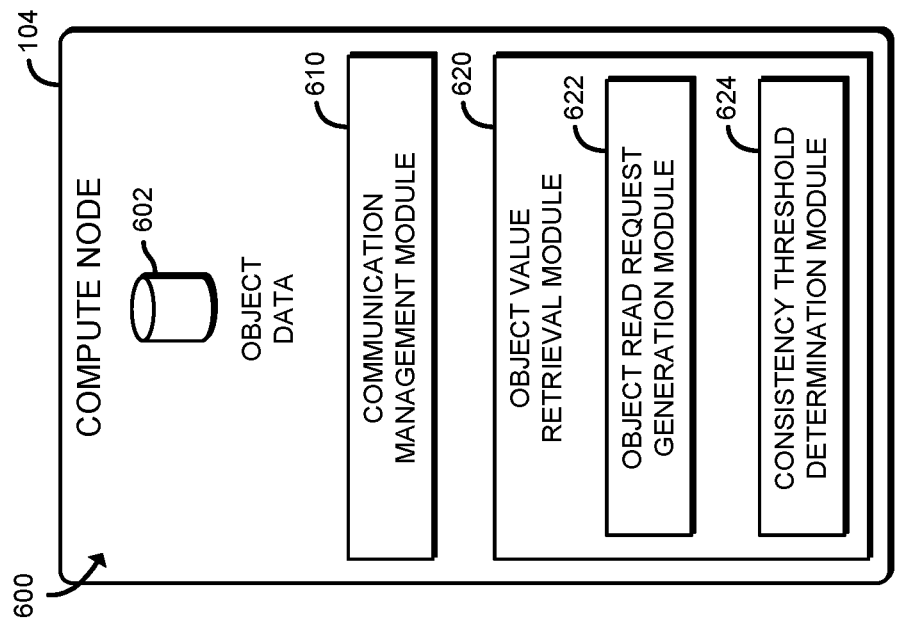
FIG. 6 is a simplified block diagram of at least one embodiment of an environment that may be established by one of the compute nodes of the system of FIG. 1.

Referring now to FIG. 6, in an illustrative embodiment, one of the computing nodes 102 (e.g., one of the compute nodes 104 of FIG. 1) configured to manage the computation of executing applications (e.g., application processes, threads, etc.) establishes an environment 600 during operation. The illustrative environment 600 includes a communication management module 610 and an object value retrieval module 620. The various modules of the environment 600 may be embodied as hardware, firmware, software, or a combination thereof. As such, in some embodiments, one or more of the modules of the environment 600 may be embodied as circuitry or collection of electrical devices (e.g., a communication management circuit 610, an object value retrieval circuit 620, etc.).

It should be appreciated that, in such embodiments, one or more of the communication management circuit 610 and the object value retrieval circuit 620 may form a portion of one or more of the processors 202, 208, the I/O subsystem 214, the communication circuitry 220 (e.g., the HFI 222), and/or other components of the compute node 104. Additionally, in some embodiments, one or more of the illustrative modules may form a portion of another module and/or one or more of the illustrative modules may be independent of one another. Further, in some embodiments, one or more of the modules of the environment 600 may be embodied as virtualized hardware components or emulated architecture, which may be established and maintained by the one or more processors and/or other components of the compute node 104.

In the illustrative environment 600, the compute node 104 further includes object data 602, which may be stored in the main memory 216, the data storage device 218, and/or another data storage medium of the compute node 104. Further, the object data 602 may be accessed by the various modules and/or sub-modules of the compute node 104. Although the various data utilized by the compute node 104 is described herein as particular discrete data, such data may be combined, aggregated, and/or otherwise form portions of a single or multiple data sets, including duplicative copies, in other embodiments. It should be further appreciated that the compute node 104 may include additional and/or alternative components, sub-components, modules, sub-modules, and/or devices commonly found in a computing device, which are not illustrated in FIG. 6 for clarity of the description.

The communication management module 610, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the compute node 104. To do so, the communication management module 610 is configured to receive and process network packets from network computing devices (e.g., other computing nodes 102, network switches 116, etc.) communicatively coupled to the network compute node 104 (e.g., via fabric interconnects). Additionally, the communication management module 610 is configured to prepare and transmit network packets to network computing devices (e.g., other computing nodes 102, network switches 116, etc.) communicatively coupled to the compute node 104 (e.g., via fabric interconnects).

The object value retrieval module 620, which may be embodied as hardware, firmware, software, virtualized hardware, emulated architecture, and/or a combination thereof as discussed above, is configured to manage the generation and transmission of object read requests, such as may be transmitted by the communication management module 610. To do so, the illustrative object value retrieval module 620 includes an object read request generation module 622 and a consistency threshold determination module 624. It should be appreciated that each of the object read request generation module 622 and the consistency threshold determination module 624 of the object value retrieval module 620 may be separately embodied as hardware, firmware, software, virtualized hardware, emulated architecture, and/or a combination thereof. For example, the object read request generation module 622 may be embodied as a hardware component, while the consistency threshold determination module 624 may be embodied as a virtualized hardware component or as some other combination of hardware, firmware, software, virtualized hardware, emulated architecture, and/or a combination thereof.

The object read request generation module 622 is configured to generate one or more object read requests corresponding to those object(s) being requested. For example, an application (e.g., a thread, a process, etc.) presently executing on a processor core (e.g., one of the processor cores 204, 210) of the compute node 102 may indicate to the HFI (e.g., the HFI 222) of the compute node 104 (e.g., via one or more instructions to the software stack) that an object value is requested for retrieval from a computing node 102 (e.g., one of the storage nodes 110) at which the object, and the value thereof, is maintained. Accordingly, the object read request generation module 622 is configured to generate an object read request in response to having received such an indication.

Additionally, the object read request generation module 622 is configured to generate such an object read request with one or more object identifiers usable to identify the object, including a base address of the object, a size of the object, etc., as well as any other object information that is usable to satisfy a condition of the value of the object, such as one or more data consistency thresholds (e.g., an amount of time a present value of the object has been stored in the cache of the network switch 116, a version associated with the present value of the object, or any other data consistency threshold). Accordingly, the object read request may be transmitted by the compute node 104 to the coupled network switch 116, such as may be performed by the communication management module 610. In some embodiments, the object information may be stored in the object data 602.

The consistency threshold determination module 624 is configured to determine the one or more data consistency thresholds to be included with the object read request, such as may be included by the object read request generation module 622 upon generation of the object read request. To do so, the consistency threshold determination module 624 is configured to determine which data consistency thresholds are to be included and the appropriate values for the data consistency thresholds determined to be included. As described previously, the data consistency thresholds define one or more thresholds usable for determining whether an object value presently stored in a cache memory of the network switch 116 is an acceptable value. Such data consistency thresholds may include a minimum acceptable version number (i.e., a minimum acceptable version threshold), a maximum duration of time to store in cache (i.e., a maximum cache duration threshold), a maximum number of accesses (i.e., a maximum cache hit threshold), etc.

For example, the consistency threshold determination module 624 may determine that it is not necessary for a value of the object to be equal to a present value of the object as stored by its respective storage node 110, but that the latest value stored in cache of the network switch 116 may be usable if the value has not been stored for longer than a particular duration of time (e.g., 30 seconds, 5 minutes, etc.). Accordingly, under such conditions, the consistency threshold determination module 624 may indicate (e.g., to the object read request generation module 622) that a maximum cache duration threshold that indicates that particular duration of time is to be included with the object read request.

In another example, the consistency threshold determination module 624 may determine that it is not necessary for a value of the object to be equal to a present value of the object as stored by its respective storage node 110, but that the latest value stored in cache of the network switch 116 may be usable if a corresponding version of the value is greater than or equal to an acceptable version as determined by the consistency threshold determination module 624 (e.g., in coordination with the requesting application). Accordingly, under such conditions, the consistency threshold determination module 624 may indicate (e.g., to the object read request generation module 622) that a minimum acceptable version threshold that indicates that minimum acceptable version is to be included with the object read request.

Figure 7A:
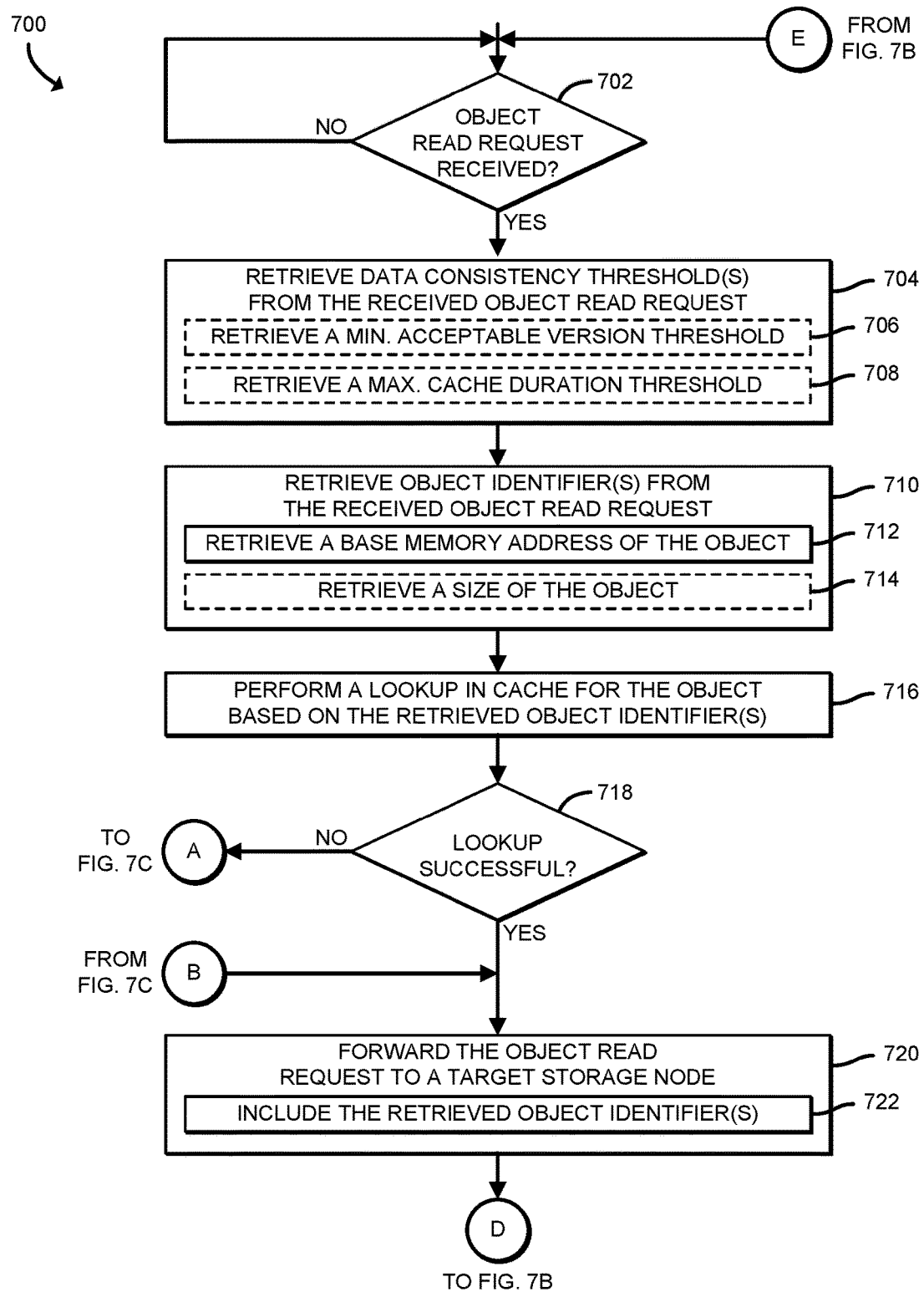
FIGS. 7A-7C is a simplified flow diagram of at least one embodiment of a method for processing an object read request to retrieve a value of an object that may be executed by the network switch of FIGS. 3 and 5.
Figure 7B:
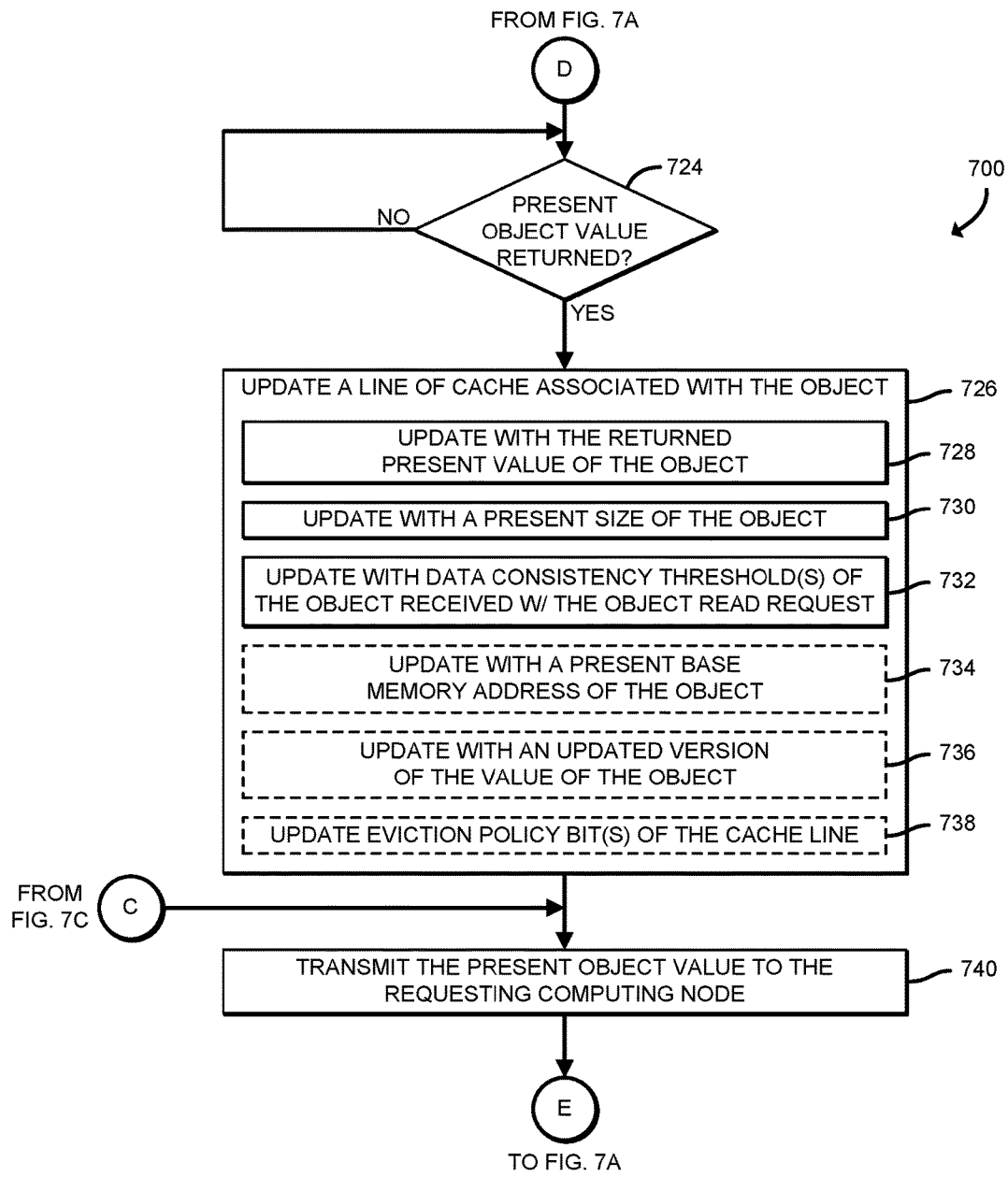

Referring now to FIGS. 7A-7B, in use, the network switch 116 may execute a method 700 for processing an object read request to retrieve a value of an object. The method 700 begins in block 702, in which the network switch 116 determines whether an object read request has been received from a communicatively coupled computing node 102 (e.g., one of the compute nodes 104 of FIG. 1). If so, the method 700 advances to block 704, in which the network switch 116 retrieves one or more data consistency thresholds from the object read request received in block 702. As described previously, the data consistency thresholds define one or more thresholds usable for determining whether an object value presently stored in a cache memory of the network switch 116 is an acceptable value, including a minimum acceptable version threshold, a maximum cache duration threshold, a maximum cache hit threshold, etc. Accordingly, in some embodiments, in block 706, the network switch 116 may retrieve a minimum acceptable version threshold. Additionally or alternatively, in some embodiments, in block 708, the network switch may retrieve a maximum cache duration threshold.

In block 710, the network switch 116 retrieves one or more object identifiers from the received object read request. For example, in block 712, the network switch 116 retrieves a base memory address of the object. Additionally, in some embodiments, in block 714, the network switch 116 may retrieve a size of the object. In block 716, the network switch 116 performs a lookup in cache (e.g., the cache memory 302 of FIG. 3) of the network switch 116 for the object based on the one or more object identifiers retrieved in block 710. In block 718, the network switch 116 determines whether the lookup was successful (i.e., a cache hit). In other words, the network switch 116 determines whether the requested object value is presently stored in cache. If the lookup was not successful (i.e., a cache miss), the method 700 branches to block 742 (shown in FIG. 7C), which is described below; otherwise, the method 700 branches to block 720, in which the network switch 116 forwards the object read request to a target storage node (e.g., one of the storage nodes 110 of FIG. 1) at which the object, and the value thereof, is stored and maintained. Additionally, in block 722, the network switch 116 includes the one or more object identifiers retrieved from the received object read request.

In block 724, as shown in FIG. 7B, the network switch 116 determines whether a response message including a present value of the object has been returned from the target storage node. If so, the method 700 advances to block 726, in which the network switch 116 updates a cache line of the cache of the network switch 116 with object information returned by the target storage node. To do so, in block 728, the network switch 116 updates the cache line with the present value of the object returned in block 724. Additionally, in block 730, the network switch 116 updates the cache line with a present size of the object, which may have been received along with the returned present object value, in some embodiments. In block 732, the network switch 116 updates the cache line with the one or more data consistency thresholds associated with the object that were received with the object read request. In some embodiments, in block 734, the network switch 116 may update the cache line with an updated present base memory address of the object, which may have also been received with the returned present object value. Additionally or alternatively, in some embodiments, in block 736, the network switch 116 may update the cache line with an updated version of the value of the object. In some embodiments, in block 738, the network switch 116 may additionally or alternatively update one or more eviction policy bits of the cache line.

In block 740, the network switch 116 transmits the present object value received in block 724 to the computing node 102 from which the object read request was received, before the method returns to block 702 to determine whether another object read request has been received. It should be appreciated that the normal eviction policies may be applied to the cache line hereafter, such as to determine whether to remove the cache line upon a determination that the cache is full.

Figure 7C:
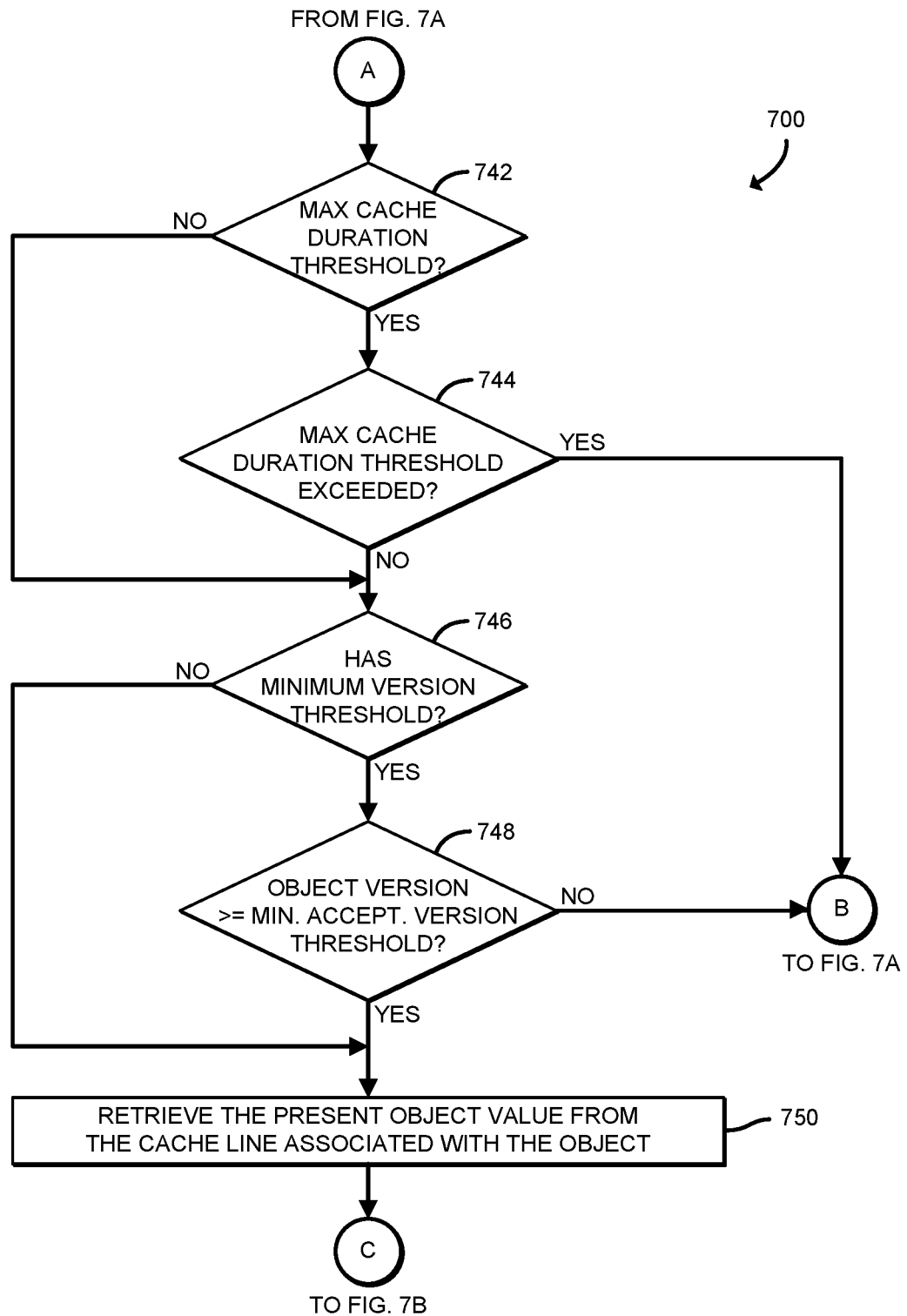

Referring again block 718 of FIG. 7A, as described previously, if the network switch 116 determines the lookup was successful (i.e., a cache hit), the method 700 branches to block 742 of FIG. 7C to determine whether any associated data consistency thresholds have been violated. In block 742, the network switch 116 determines whether the object of the cache line has an associated maximum cache duration threshold. If so, the method 700 branches to block 744, in which the network switch 116 determines whether the maximum cache duration threshold has been exceeded. In other words, the network switch 116 determines whether the amount of time the value of the object has been stored in cache exceeds the maximum cache duration threshold. If so, the method 700 branches to block to block 720 of FIG. 7A, in which the network switch 116 forwards the object read request to a target storage node. In other words, the network switch 116 requests a new value of the object.

Referring again to block 742, if the network switch 116 determines that the object of the cache line does not an associated maximum cache duration threshold, the method 700 branches to block 746, in which the network switch 116 determines whether the object of the cache line has an associated minimum acceptable version threshold. If not, the method 700 branches to block 750, in which the network switch 116 retrieves the present object value from the cache line associated with the object for which the value has been requested. Otherwise, if the network switch 116 determines the object of the cache line has an associated minimum acceptable version threshold, the method 700 branches to block 748.

In block 748, the network switch 116 determines whether the most recent version associated with the value of the object is greater than or equal to the minimum acceptable version threshold of the object read request. If not, the method 700 branches to block to block 720 of FIG. 7A, in which the network switch 116 forwards the object read request to a target storage node. In other words, the network switch 116 requests a new value of the object. Otherwise, if the network switch 116 determines the most recent version associated with the value of the object is greater than or equal to the minimum acceptable version threshold of the object read request, the method 700 branches to block 750, in which the network switch 116 retrieves the present object value from the cache line associated with the object for which the value has been requested.

It should be appreciated that at least a portion of the method 700 may be executed by the communication circuitry 310 of the network switch 116. It should be further appreciated that, in some embodiments, at least a portion of the method 700 may be embodied as various instructions stored on a computer-readable media, which may be executed by the processor 300, the communication circuitry 310, and/or other components of the network switch 116 to cause the network switch 116 to perform the method 700. The computer-readable media may be embodied as any type of media capable of being read by the network switch 116 including, but not limited to, the main memory 306, the data storage device 308, other memory or data storage devices of the network switch 116, portable media readable by a peripheral device of the network switch 116, and/or other media.

EXAMPLES

Illustrative examples of the technologies disclosed herein are provided below. An embodiment of the technologies may include any one or more, and any combination of, the examples described below.

Example 1 includes a network switch for object-based data consistency in a fabric architecture in which the network switch is communicatively coupled to a plurality of computing nodes of the fabric architecture, the network switch comprising a processor having a cache memory; a main memory externally coupled to the processor; and one or more data storage devices having stored therein a plurality of instructions that, when executed by the processor, cause the network switch to receive an object read request from a compute node of the plurality of computing nodes, wherein the object read request includes an object identifier and a data consistency threshold; perform a lookup for a value of an object in the cache memory as a function of the object identifier; determine, in response to a determination that the lookup successfully returned the value of the object, whether a condition of the value of the object violates the data consistency threshold; transmit, in response to a determination that the condition of the value of the object does not violate the data consistency threshold, the value of the object to the compute node.

Example 2 includes the subject matter of Example 1, and wherein the data consistency threshold comprises a minimum acceptable version threshold.

Example 3 includes the subject matter of any of Examples 1 and 2, and wherein to determine the condition of the value of the object corresponding to the object identifier violates the data consistency threshold comprises to determine that a version associated with the value of the object is less than the minimum acceptable version threshold.

Example 4 includes the subject matter of any of Examples 1-3, and wherein to transmit the value of the object to the compute node comprises to transmit the value of the object to the compute node in response to a determination that the version associated with the value of the object is greater than or equal to the minimum acceptable version threshold.

Example 5 includes the subject matter of any of Examples 1-4, and wherein the data consistency threshold comprises a maximum cache duration threshold.

Example 6 includes the subject matter of any of Examples 1-5, and wherein to determine whether the condition of the value of the object corresponding to the object identifier violates the data consistency threshold comprises to determine whether the value of the object has been stored in a cache line of a plurality of cache lines of the cache memory for a duration of time greater than the maximum cache duration threshold.

Example 7 includes the subject matter of any of Examples 1-6, and wherein to transmit the value of the object to the compute node comprises to transmit the value of the object to the compute node in response to a determination that the value of the object has been stored in a cache line of a plurality of cache lines of the cache for a duration of time less than or equal to the maximum cache duration threshold.

Example 8 includes the subject matter of any of Examples 1-7, and wherein the plurality of instructions further cause the network switch to forward, in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes; receive a response message from the target storage node, wherein the response message includes the present value of the object; transmit the received present value of the object to the compute node; update the value of the object at a cache line of a plurality of cache lines of the cache memory, wherein the cache line is associated with the object; and update the data consistency threshold of the value of the object based on the data consistency threshold received with the object read request.

Example 9 includes a network switch for object-based data consistency in a fabric architecture in which the network switch is communicatively coupled to a plurality of computing nodes of the fabric architecture, the network switch comprising a communication management circuit to receive an object read request from a compute node of the plurality of computing nodes, wherein the object read request includes an object identifier and a data consistency threshold; and a cache management circuit to (i) perform a lookup for a value of an object in a cache memory of a processor of the network switch as a function of the object identifier and (ii) determine, in response to a determination that the lookup successfully returned the value of the object, whether a condition of the value of the object violates the data consistency threshold; wherein the communication management circuit is further to transmit, in response to a determination that the condition of the value of the object does not violate the data consistency threshold, the value of the object to the compute node.

Example 10 includes the subject matter of Example 9, and wherein the data consistency threshold comprises a minimum acceptable version threshold.

Example 11 includes the subject matter of any of Examples 9 and 10, and wherein to determine the condition of the value of the object corresponding to the object identifier violates the data consistency threshold comprises to determine that a version associated with the value of the object is less than the minimum acceptable version threshold.

Example 12 includes the subject matter of any of Examples 9-11, and wherein to transmit the value of the object to the compute node comprises to transmit the value of the object to the compute node in response to a determination that the version associated with the value of the object is greater than or equal to the minimum acceptable version threshold.

Example 13 includes the subject matter of any of Examples 9-12, and wherein the data consistency threshold comprises a maximum cache duration threshold.

Example 14 includes the subject matter of any of Examples 9-13, and wherein to determine whether the condition of the value of the object corresponding to the object identifier violates the data consistency threshold comprises to determine whether the value of the object has been stored in a cache line of a plurality of cache lines of the cache memory for a duration of time greater than the maximum cache duration threshold.

Example 15 includes the subject matter of any of Examples 9-14, and, wherein to transmit the value of the object to the compute node comprises to transmit the value of the object to the compute node in response to a determination that the value of the object has been stored in a cache line of a plurality of cache lines of the cache for a duration of time less than or equal to the maximum cache duration threshold.

Example 16 includes the subject matter of any of Examples 9-15, and wherein the communication management circuit is further to (i) forward, in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes, (ii) receive a response message from the target storage node, wherein the response message includes the present value of the object, and (iii) transmit the received present value of the object to the compute node; and wherein the cache management circuit is further to (i) update the value of the object at a cache line of a plurality of cache lines of the cache memory, wherein the cache line is associated with the object and (ii) update the data consistency threshold of the value of the object based on the data consistency threshold received with the object read request.

Example 17 includes a method for object-based data consistency in a fabric architecture includes a network switch communicatively coupled to a plurality of computing nodes, the method comprising receiving, by the network switch, an object read request from a compute node of the plurality of computing nodes, wherein the object read request includes an object identifier and a data consistency threshold; performing, by the network switch, a lookup for a value of an object in a cache memory of a processor of the network switch as a function of the object identifier; determining, by the network switch and in response to a determination that the lookup successfully returned the value of the object, whether a condition of the value of the object violates the data consistency threshold; transmitting, by the network switch and in response to a determination that the condition of the value of the object does not violate the data consistency threshold, the value of the object to the compute node.

Example 18 includes the subject matter of Example 17, and wherein receiving the data consistency threshold with the object read request comprises receiving a minimum acceptable version threshold with the object read request.

Example 19 includes the subject matter of any of Examples 17 and 18, and wherein determining the condition of the value of the object corresponding to the object identifier violates the data consistency threshold comprises determining that a version associated with the value of the object is less than the minimum acceptable version threshold.

Example 20 includes the subject matter of any of Examples 17-19, and wherein transmitting the value of the object to the compute node comprises transmitting the value of the object to the compute node in response to a determination that the version associated with the value of the object is greater than or equal to the minimum acceptable version threshold.

Example 21 includes the subject matter of any of Examples 17-20, and wherein receiving the data consistency threshold with the object read request comprises receiving a maximum cache duration threshold with the object read request.

Example 22 includes the subject matter of any of Examples 17-21, and wherein determining whether the condition of the value of the object corresponding to the object identifier violates the data consistency threshold comprises determining whether the value of the object has been stored in a cache line of a plurality of cache lines of the cache memory for a duration of time greater than the maximum cache duration threshold.

Example 23 includes the subject matter of any of Examples 17-22, and wherein transmitting the value of the object to the compute node comprises transmitting the value of the object to the compute node in response to a determination that the value of the object has been stored in a cache line of a plurality of cache lines of the cache for a duration of time less than or equal to the maximum cache duration threshold.

Example 24 includes the subject matter of any of Examples 17-23, and further including forwarding, by the network switch and in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes; receiving, by the network switch, a response message from the target storage node, wherein the response message includes the present value of the object; transmitting, by the network switch, the received present value of the object to the compute node; updating, by the network switch, the value of the object at a cache line of a plurality of cache lines of the cache memory, wherein the cache line is associated with the object; and updating, by the network switch, the data consistency threshold of the value of the object based on the data consistency threshold received with the object read request.

Example 25 includes a network switch comprising a processor; and a memory having stored therein a plurality of instructions that when executed by the processor cause the network switch to perform the method of any of Examples 13-24.

Example 26 includes one or more machine readable storage media comprising a plurality of instructions stored thereon that in response to being executed result in a network switch performing the method of any of Examples 13-24.

Example 27 includes a network switch for object-based data consistency in a fabric architecture in which the network switch is communicatively coupled to a plurality of computing nodes of the fabric architecture, the network switch comprising a communication management circuit to receive an object read request from a compute node of the plurality of computing nodes, wherein the object read request includes an object identifier and a data consistency threshold; means for performing a lookup for a value of an object in a cache memory of a processor of the network switch as a function of the object identifier; and means for determining, in response to a determination that the lookup successfully returned the value of the object, whether a condition of the value of the object violates the data consistency threshold, wherein the communication management circuit is further to transmit, in response to a determination that the condition of the value of the object does not violate the data consistency threshold, the value of the object to the compute node.

Example 28 includes the subject matter of Example 27, and wherein the data consistency threshold comprises a minimum acceptable version threshold.

Example 29 includes the subject matter of any of Examples 27 and 28, and wherein the means for determining the condition of the value of the object corresponding to the object identifier violates the data consistency threshold comprises means for determining that a version associated with the value of the object is less than the minimum acceptable version threshold.

Example 30 includes the subject matter of any of Examples 27-29, and wherein to transmit the value of the object to the compute node comprises to transmit the value of the object to the compute node in response to a determination that the version associated with the value of the object is greater than or equal to the minimum acceptable version threshold.

Example 31 includes the subject matter of any of Examples 27-30, and wherein the data consistency threshold comprises a maximum cache duration threshold.

Example 32 includes the subject matter of any of Examples 27-31, and wherein the means for determining whether the condition of the value of the object corresponding to the object identifier violates the data consistency threshold comprises means for determining whether the value of the object has been stored in a cache line of a plurality of cache lines of the cache memory for a duration of time greater than the maximum cache duration threshold.

Example 33 includes the subject matter of any of Examples 27-32, and wherein to transmit the value of the object to the compute node comprises to transmit the value of the object to the compute node in response to a determination that the value of the object has been stored in a cache line of a plurality of cache lines of the cache for a duration of time less than or equal to the maximum cache duration threshold.

Example 34 includes the subject matter of any of Examples 27-33, and wherein the communication management circuit is further to (i) forward, in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes, (ii) receive a response message from the target storage node, wherein the response message includes the present value of the object, and (iii) transmit the received present value of the object to the compute node, and further comprising means for updating the value of the object at a cache line of a plurality of cache lines of the cache memory, wherein the cache line is associated with the object; and means for updating the data consistency threshold of the value of the object based on the data consistency threshold received with the object read request.

The invention claimed is:

1. A network switch for object-based data consistency in a fabric architecture in which the network switch is communicatively coupled to a plurality of computing nodes of the fabric architecture, the network switch comprising:
   a processor having a cache memory;
   a main memory externally coupled to the processor; and
   one or more data storage devices having stored therein a plurality of instructions that, when executed by the processor, cause the network switch to:
      receive an object read request from a compute node of the plurality of computing nodes, wherein the object read request includes an object identifier and a data consistency threshold;
      perform a lookup for a value of an object in the cache memory as a function of the object identifier;
      determine, in response to a determination that the lookup successfully returned the value of the object, whether a condition of the value of the object violates the data consistency threshold; and
      transmit, in response to a determination that the condition of the value of the object does not violate the data consistency threshold, the value of the object to the compute node.

2. The network switch of claim 1, wherein the data consistency threshold comprises a minimum acceptable version threshold.

3. The network switch of claim 2, wherein to determine the condition of the value of the object corresponding to the object identifier violates the data consistency threshold comprises to determine that a version associated with the value of the object is less than the minimum acceptable version threshold.

4. The network switch of claim 2, wherein to transmit the value of the object to the compute node comprises to transmit the value of the object to the compute node in response to a determination that the version associated with the value of the object is greater than or equal to the minimum acceptable version threshold.

5. The network switch of claim 1, wherein the data consistency threshold comprises a maximum cache duration threshold.

6. The network switch of claim 5, wherein to determine whether the condition of the value of the object corresponding to the object identifier violates the data consistency threshold comprises to determine whether the value of the object has been stored in a cache line of a plurality of cache lines of the cache memory for a duration of time greater than the maximum cache duration threshold.

7. The network switch of claim 5, wherein to transmit the value of the object to the compute node comprises to transmit the value of the object to the compute node in response to a determination that the value of the object has been stored in a cache line of a plurality of cache lines of the cache for a duration of time less than or equal to the maximum cache duration threshold.

8. The network switch of claim 1, wherein the plurality of instructions further cause the network switch to:
    forward, in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes;
    receive a response message from the target storage node, wherein the response message includes the present value of the object;
    transmit the received present value of the object to the compute node;
    update the value of the object at a cache line of a plurality of cache lines of the cache memory, wherein the cache line is associated with the object; and
    update the data consistency threshold of the value of the object based on the data consistency threshold received with the object read request.

9. One or more non-transitory, computer-readable storage media comprising a plurality of instructions stored thereon that in response to being executed cause a network switch to:
    receive an object read request from a compute node of the plurality of computing nodes, wherein the object read request includes an object identifier and a data consistency threshold;
    perform a lookup for a value of an object in a cache memory of a processor of the network switch as a function of the object identifier;
    determine, in response to a determination that the lookup successfully returned the value of the object, whether a condition of the value of the object violates the data consistency threshold; and
    transmit, in response to a determination that the condition of the value of the object does not violate the data consistency threshold, the value of the object to the compute node.

10. The one or more non-transitory, computer-readable storage media of claim 9, wherein the data consistency threshold comprises a minimum acceptable version threshold.

11. The one or more non-transitory, computer-readable storage media of claim 10, wherein to determine the condition of the value of the object corresponding to the object identifier violates the data consistency threshold comprises to determine that a version associated with the value of the object is less than the minimum acceptable version threshold.

12. The one or more non-transitory, computer-readable storage media of claim 10, wherein to transmit the value of the object to the compute node comprises to transmit the value of the object to the compute node in response to a determination that the version associated with the value of the object is greater than or equal to the minimum acceptable version threshold.

13. The one or more non-transitory, computer-readable storage media of claim 9, wherein the data consistency threshold comprises a maximum cache duration threshold.

14. The one or more non-transitory, computer-readable storage media of claim 13, wherein to determine whether the condition of the value of the object corresponding to the object identifier violates the data consistency threshold comprises to determine whether the value of the object has been stored in a cache line of a plurality of cache lines of the cache memory for a duration of time greater than the maximum cache duration threshold.

15. The one or more non-transitory, computer-readable storage media of claim 13, wherein to transmit the value of the object to the compute node comprises to transmit the value of the object to the compute node in response to a determination that the value of the object has been stored in a cache line of a plurality of cache lines of the cache for a duration of time less than or equal to the maximum cache duration threshold.

16. The one or more non-transitory, computer-readable storage media of claim 9, wherein the plurality of instructions further cause the network switch to:
    forward, in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes;
    receive a response message from the target storage node, wherein the response message includes the present value of the object;
    transmit the received present value of the object to the compute node; and
    update the value of the object at a cache line of a plurality of cache lines of the cache memory, wherein the cache line is associated with the object; and
    update the data consistency threshold of the value of the object based on the data consistency threshold received with the object read request.

17. A method for object-based data consistency in a fabric architecture includes a network switch communicatively coupled to a plurality of computing nodes, the method comprising:
    receiving, by the network switch, an object read request from a compute node of the plurality of computing nodes, wherein the object read request includes an object identifier and a data consistency threshold;
    performing, by the network switch, a lookup for a value of an object in a cache memory of a processor of the network switch as a function of the object identifier;
    determining, by the network switch and in response to a determination that the lookup successfully returned the value of the object, whether a condition of the value of the object violates the data consistency threshold;

transmitting, by the network switch and in response to a determination that the condition of the value of the object does not violate the data consistency threshold, the value of the object to the compute node.

18. The method of claim 17, wherein receiving the data consistency threshold with the object read request comprises receiving a minimum acceptable version threshold with the object read request.

19. The method of claim 18, wherein determining the condition of the value of the object corresponding to the object identifier violates the data consistency threshold comprises determining that a version associated with the value of the object is less than the minimum acceptable version threshold.

20. The method of claim 17, wherein receiving the data consistency threshold with the object read request comprises receiving a maximum cache duration threshold with the object read request.

21. The method of claim 20, wherein determining whether the condition of the value of the object corresponding to the object identifier violates the data consistency threshold comprises determining whether the value of the object has been stored in a cache line of a plurality of cache lines of the cache memory for a duration of time greater than the maximum cache duration threshold.

22. The method of claim 17, further comprising:
forwarding, by the network switch and in response to a determination that the condition of the value of the object corresponding to the object identifier violates the data consistency threshold, the object read request to a target storage node of the plurality of computing nodes, wherein the object read request is usable to retrieve a present value of the object stored at a receiving one of the plurality of computing nodes;
receiving, by the network switch, a response message from the target storage node, wherein the response message includes the present value of the object;
transmitting, by the network switch, the received present value of the object to the compute node;
updating, by the network switch, the value of the object at a cache line of a plurality of cache lines of the cache memory, wherein the cache line is associated with the object; and
updating, by the network switch, the data consistency threshold of the value of the object based on the data consistency threshold received with the object read request.

23. A network switch for object-based data consistency in a fabric architecture in which the network switch is communicatively coupled to a plurality of computing nodes of the fabric architecture, the network switch comprising:
a communication management circuit to receive an object read request from a compute node of the plurality of computing nodes, wherein the object read request includes an object identifier and a data consistency threshold;
means for performing a lookup for a value of an object in a cache memory of a processor of the network switch as a function of the object identifier; and
means for determining, in response to a determination that the lookup successfully returned the value of the object, whether a condition of the value of the object violates the data consistency threshold,
wherein the communication management circuit is further to transmit, in response to a determination that the condition of the value of the object does not violate the data consistency threshold, the value of the object to the compute node.

24. The network switch of claim 23, wherein the data consistency threshold comprises a minimum acceptable version threshold and wherein the means for determining the condition of the value of the object corresponding to the object identifier violates the data consistency threshold comprises means for determining that a version associated with the value of the object is less than the minimum acceptable version threshold.

25. The network switch of claim 23, wherein the data consistency threshold comprises a maximum cache duration threshold and wherein the means for determining whether the condition of the value of the object corresponding to the object identifier violates the data consistency threshold comprises means for determining whether the value of the object has been stored in a cache line of a plurality of cache lines of the cache memory for a duration of time greater than the maximum cache duration threshold.

* * * * *